INVENTOR.
MORRIS C. BRAASCH
BY Knox & Knox

Jan. 27, 1970  M. C. BRAASCH  3,491,629
MACHINE TOOL HOLDER MOUNT WITH CENTER GAGE
Filed May 1, 1968  2 Sheets-Sheet 2
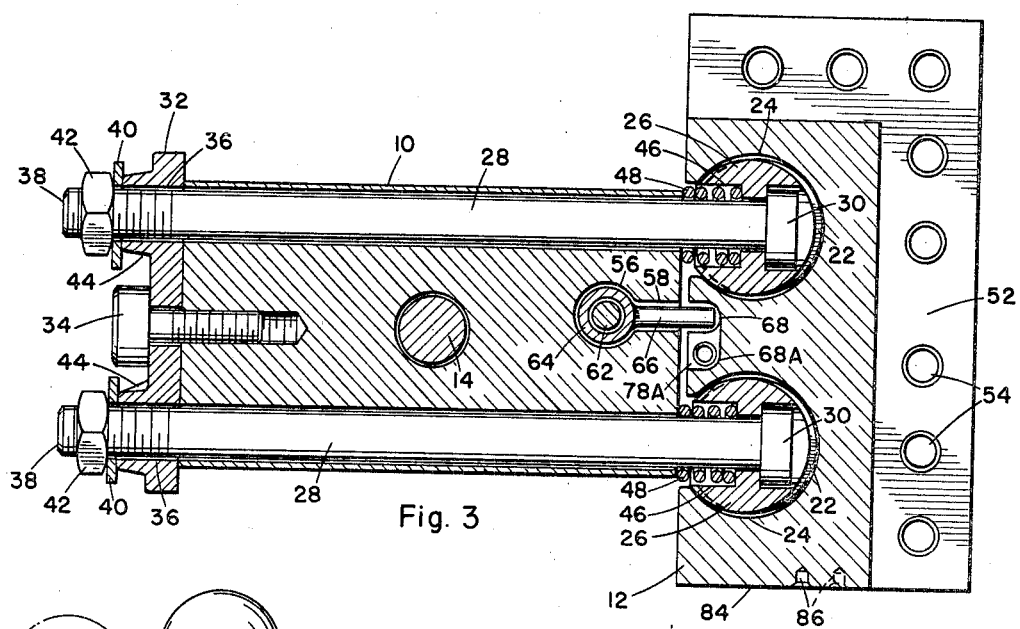
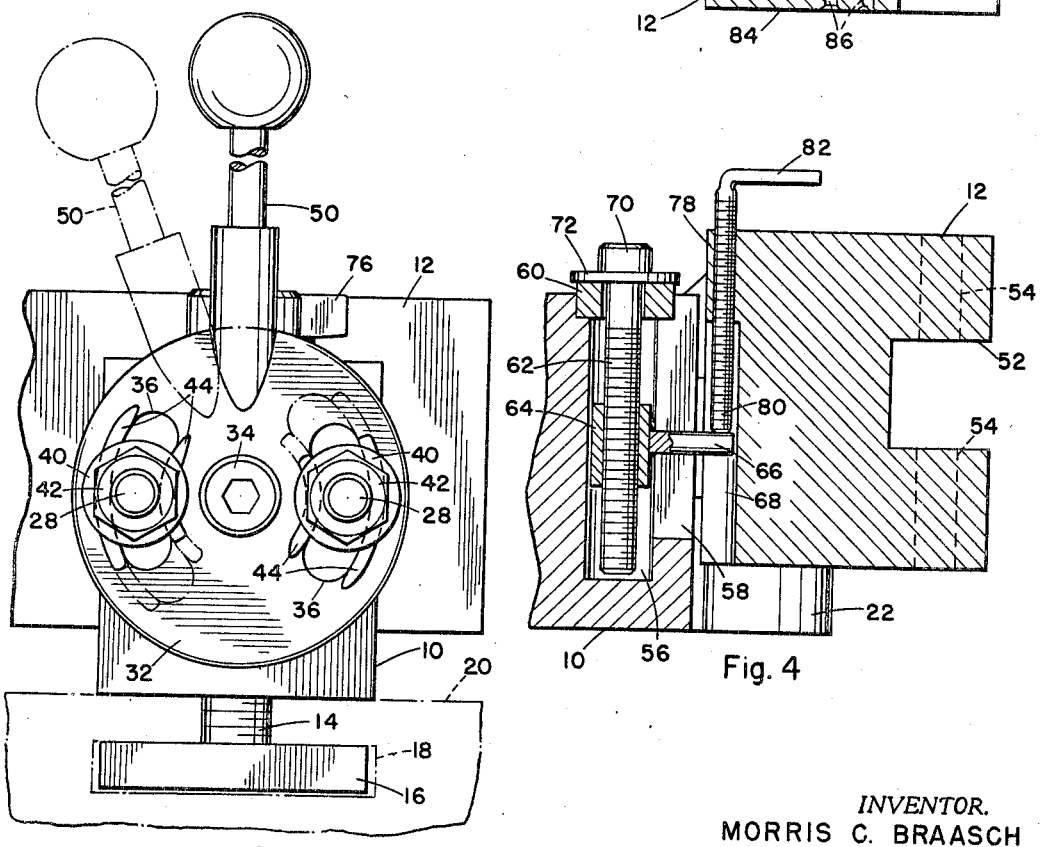
INVENTOR.
MORRIS C. BRAASCH
BY
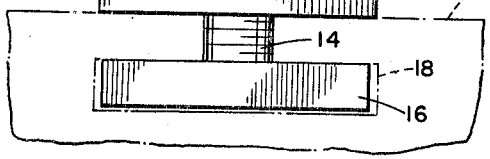

United States Patent Office 3,491,629
Patented Jan. 27, 1970

3,491,629
MACHINE TOOL HOLDER MOUNT WITH CENTER GAGE
Morris C. Braasch, Lemon Grove, Calif.
(1262 Greenfield Drive, El Cajon, Calif. 92021)
Filed May 1, 1968, Ser. No. 725,682
Int. Cl. B23b 29/04
U.S. Cl. 82—37    7 Claims

ABSTRACT OF THE DISCLOSURE

The tool mount has a tool holder portion which is slidable on guide posts for adjustment of the tool position and is locked in any set position by cam operated eccentric sections of the guide posts. For use on a lathe, the tool holder incorporates a multiple position center gage for alignment with the lathe center, accurate setting being facilitated by a screw type fine adjustment with lockable stop means for initial positioning.

BACKGROUND OF THE INVENTION

The present invention relates to tools and specifically to a machine tool holder mount with a center gage.

Machine tool holders usually have an adjustable portion being locked in place by a nut or bolt, or sometimes handle operated cam means. In some instances the tool position is set by eye, but for precise work a gage of some type must be used. Handling the gage and keeping the tool holder in position while clamping or locking can require considerable dexterity.

SUMMARY OF THE INVENTION

The tool mount described herein is adaptable to machines in a conventional manner and will hold the usual types of cutters and related tools. The tool holder portion is adjustable on posts on the mount and the posts have eccentrically movable portions which are cam operated to lock the tool holder with a jamming action. A screw adjusted stop, with locking means, is incorporated in the mount to set the rough position of the tool holder, the latter having a fine adjustment screw to permit precise positioning. On one face of the tool holder are spaced indentations comprising a gage, which facilitates direct alignment with a lathe center or other machine reference.

BRIEF DESCRIPTION OF THE DRAWINGS

FIGURE 3 is a sectional view taken on line 3—3 of FIGURE 1;

FIGURE 4 is a sectional view taken on line 4—4 of FIGURE 2; and

FIGURE 5 is an end elevation view as taken from the left hand end of FIGURE 1.

Similar characters of reference indicate similar elements and portions throughout the specification and throughout the views of the drawings.

DESCRIPTION OF THE PREFERRED EMBODIMENT

Figure 1:
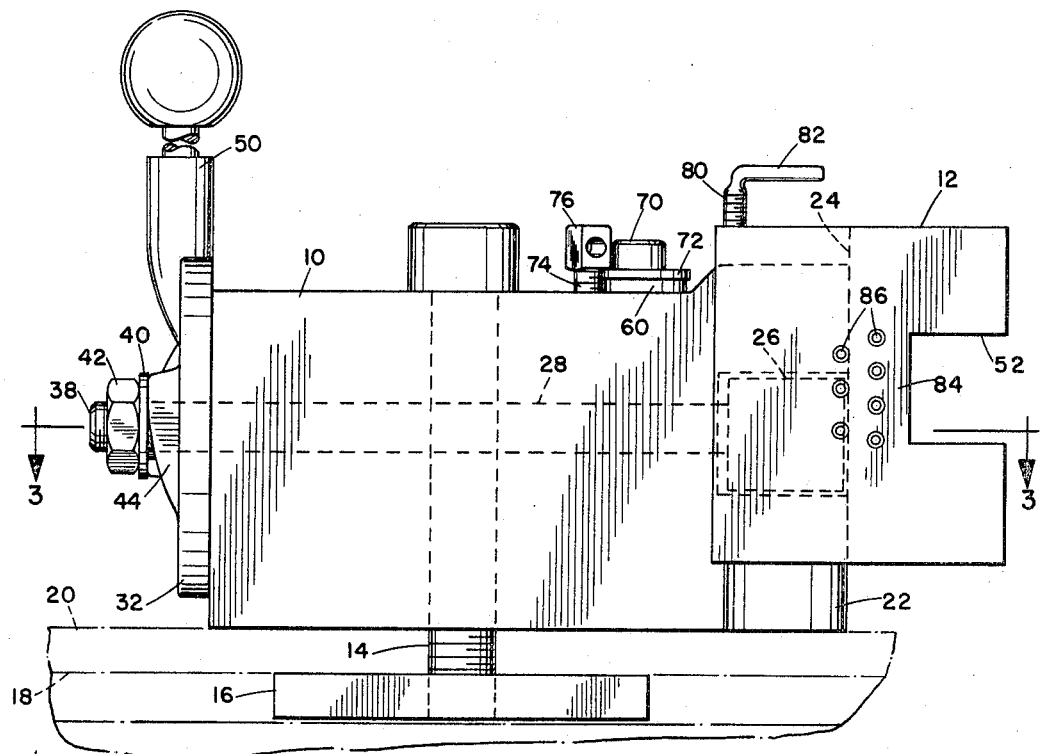
FIGURE 1 is a side elevation view of the complete unit.

The unit comprises a mounting block 10 for attachment to a machine, and a tool holder 12 which is adjustable on the mounting block and is separable and reversible thereon. Mounting block 10 is basically of simple rectangular form and is secured by a clamp screw 14 into a clamp plate 16, which fits into the conventional channel or way 18 of a machine bed 20, indicated in broken line. On one end of mounting block 10 are two spaced, parallel vertical posts 22 of generally cylindrical form, the tool holder 12 having open sided channels 24 in which the posts are smoothly slidable. The central portions of the posts are separated from the remaining portions of the posts and shiftable relative thereto, those shiftable portions being hereinafter referred to as eccentric portions 26, by which a locking action is applied in channels 24. Each eccentric portion 26 has a draw pin 28 passing through it diametrically, with the head 30 of the pin recessed therein. Draw pins 18 pass longitudinally through mounting block 10 and project from the end remote from the posts 22. On that end of the mounting block is a cam plate 32 rotatably mounted on a center pin 34 between draw pins 28, the draw pins projecting through accurate slots 36 in the cam plate. Each draw pin 28 has a threaded end 38, on which is a washer 40 and nut 42, preferably of the self-locking type. Alongside each slot 36 are ramps 44 which engage under washer 40 and cause longitudinal motion of the draw pins 28 when cam plate 32 is turned. Each eccentric portion 26 has a counterbore 46 in which a compression spring 48 is inserted to bias the eccentric portion away from mounting block 10.

Figure 2:
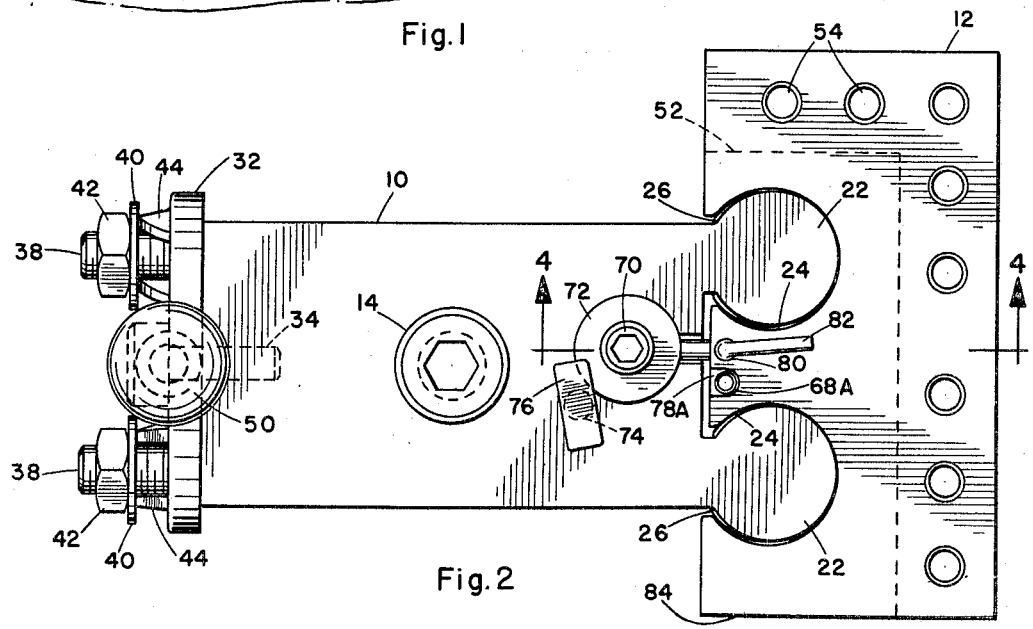
FIGURE 2 is a top plan view thereof.

To facilitate operation of the locking means, cam plate 32 has a radially extending handle 50 of suitable length. For ease of operation the nuts 42 are adjusted so that when the cam plate 32 is in the unlocked position, shown in the broken line in FIGURE 5, the ramps 44 are positioned to hold eccentric portions 26 in axial alignment with their respective posts 22. In this position the tool holder 12 will slide easily on the posts. When the cam plate is turned to the position shown in full line in FIGURE 5 and in FIGURES 1–3, ramps 44 bears against washers 40 and pull the draw pins 28 against springs 48. This moves the eccentric portions 26 out of alignment with posts 22 and causes a jamming action in channels 24, to lock the tool holder in place.

Tool holder 12 is shown as a generally rectangular block with a slot 52 along one side and one end. The portions above and below the slot have threaded holes 54 for locking screws, to hold tools positioned in the slot. Other configurations may be used, the structure shown being typical.

The fine adjustment mechanism is incorporated into both the mounting block and tool holder. Mounting block 10 has a vertical bore 56, open at the upper end, with a coextensive slot 58 opening to the end of the block between posts 22. In the upper end of bore 56 is a plug 60, which supports a stop screw 62 extending co-axially into the bore. Mounted on stop screw 62 is a threaded collar 64 with a stop pin 66 extending through slot 58 into the tool holder 12, which has a vertical channel 68 to clear the stop pin. Fixed under the head 70 of stop screw 62 is a flange 72, and threaded into the mounting block is a lock screw 74 having a T-bar head 76 which can be turned to bear on the flange and lock the stop screw against rotation, as in FIGURE 2.

In the tool holder 12 the channel 68 has a closed upper end portion 78 through which is threaded a setting screw 80, extending in the channel to rest on stop pin 66. The upper end of setting screw 80 has a bar 82, or other suitable head, to facilitate manual adjustment. It should be noted that the stop pin 66 is positioned off center relative to posts 22, the channel 68 being correspondingly off center. Tool holder has a second channel 68A with a threaded closed end 78A, extending alongside but reversed relative to the other channel and equally offset on the other side of center. This makes it possible to invert the tool holder on the mounting block for certain applications.

To enable the tool holder to be set accurately in relation to a lathe center, or other machine reference point, a gage is provided on one end face 84 of the tool holder.

The gage is shown as a plurality of shallow indentations 86 arranged in a specific spaced relation of convenient increments. To permit close spacing the indentations are staggered in two vertical rows and are preferably of conical form, as made by a drill point, to provide an accurate center reference.

For initial set up, with the mounting unit in place on the machine, the cam plate 32 is turned to the unlocked position to free the tool holder. Stop screw 62 is then turned to raise or lower stop pin 66 and hold the tool holder at the approximate position, after which the stop screw is locked by bar 76. Setting screw 80 is then turned to adjust the tool holder to its final position. If required the unit can be swung to allow the gage to be aligned with the lathe center, or reference point of the machine in use, the setting screw enabling a precise adjustment to be made. Once set, the tool holder is secured by turning cam plate 32 to the locked position to jam the eccentric portions 26. For some applications or for holding particular tools, it may be necessary to reverse or invert the tool holder, particularly with the non-symmetrical type of tool holder shown. This is easily accomplished by removing the tool holder, transferring the setting screw 80 from closed end 78 to the other closed end 78A and replacing the tool holder in inverted position. Adjustments are then made as described above.

It is understood that minor variation from the form of the invention disclosed herein may be made without departure from the spirit and scope of the invention, and that the specification and drawings are to be considered as merely illustrative rather than limiting.

I claim:
1. A machine tool holding unit, comprising:
a mounting block having means for attachment to a machine;
said mounting block having spaced parallel posts thereon;
a tool holder slidably mounted on said posts;
portions of said posts being movable eccentrically;
locking means engaging said post portions and being operable to hold the portions selectively in an unlocked position aligned with said posts and a locked position eccentrically offset from the posts, thereby jamming said tool holder on the posts;
a stop on said mounting block;
said tool holder having a setting screw therein extending parallel to said posts and engaging said stop, for fine adjustment of the tool holder on the posts.

2. The structure of claim 1, wherein said stop is adjustably mounted on said mounting block.

3. The structure of claim 2, and including lock means engageable with said stop.

4. The structure of claim 1, wherein said stop is adjustably mounted on said mounting block and projects therefrom between said posts, said tool holder having a channel in which said stop rides, and said channel having a closed end through which said setting screw passes into the channel.

5. The structure of claim 4, wherein said stop and said channel are offset from center between said posts, said tool holder having a second closed ended channel to receive said setting screw, said second channel extending alongside the first mentioned channel in reversed relation thereto and similarly offset on the opposite side of center, whereby said tool holder is invertible on said posts.

6. The structure of claim 1, wherein one face of said tool holder substantially parallel to said posts has a multiple position gage thereon.

7. The structure of claim 6, wherein said gage comprises spaced indentations in said face.

References Cited

UNITED STATES PATENTS

| | | | |
|---|---|---|---|
| 2,403,405 | 7/1946 | Sirola | 82—36 XR |
| 3,103,839 | 9/1963 | Mancuso | 82—36 |

LEONIDAS VLACHOS, Primary Examiner

UNITED STATES PATENT OFFICE
CERTIFICATE OF CORRECTION

Patent No. 3,491,629                     Dated January 27, 1970

Inventor(s)  Morris C. Braasch

It is certified that error appears in the above-identified patent and that said Letters Patent are hereby corrected as shown below:

In Column 2, line 9 the number "18" should be --28--.

In Column 2, line 31 the word "bears" should be --bear--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents